(12) United States Patent
Williams

(10) Patent No.: US 11,530,002 B2
(45) Date of Patent: Dec. 20, 2022

(54) VEHICLES HAVING PIVOTABLE AND ROTATABLE TAILGATE MEMBERS

(71) Applicant: TOYOTA MOTOR ENGINEERING & MANUFACTURING NORTH AMERICA, INC., Plano, TX (US)

(72) Inventor: Paxton S. Williams, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 198 days.

(21) Appl. No.: 17/011,625

(22) Filed: Sep. 3, 2020

(65) Prior Publication Data

US 2022/0063736 A1    Mar. 3, 2022

(51) Int. Cl.
*B62D 33/027*    (2006.01)
*B62D 33/03*     (2006.01)
*B62D 33/037*    (2006.01)
*E05D 11/10*     (2006.01)

(52) U.S. Cl.
CPC ......... *B62D 33/03* (2013.01); *B62D 33/0273* (2013.01); *B62D 33/037* (2013.01); *E05D 11/1007* (2013.01); *E05Y 2900/546* (2013.01)

(58) Field of Classification Search
CPC .. B62D 33/03; B62D 33/0273; B62D 33/037; B62D 33/027; E05Y 2900/546; E05D 11/1007
USPC ................................. 296/50, 57.1
See application file for complete search history.

(56) References Cited

U.S. PATENT DOCUMENTS

| 4,165,121 | A  | * | 8/1979  | Hori ................... B62D 33/0273 |
|           |    |   |         | 296/57.1                             |
| 4,743,058 | A  | * | 5/1988  | Fedrigo ................. B62D 35/00 |
|           |    |   |         | 296/180.1                            |
| 6,302,465 | B1 | * | 10/2001 | Faber ...................... B60R 13/01 |
|           |    |   |         | 296/50                               |
| 6,378,926 | B1 |   | 4/2002  | Renze et al.                         |
| 7,111,885 | B1 |   | 9/2006  | Hoffmann et al.                      |
| 8,976,246 | B1 |   | 3/2015  | Rappuhn                              |
| 9,821,845 | B2 |   | 11/2017 | Xu et al.                            |
| 9,923,294 | B1 | * | 3/2018  | Maranville ............ H01R 13/08   |
| 10,239,567 | B1 | * | 3/2019  | Parrish .................. B62D 33/08 |
| 10,518,687 | B2 |   | 12/2019 | DeSimone                             |

(Continued)

FOREIGN PATENT DOCUMENTS

| CN | 204915436 U |   | 12/2015 |             |
| JP | 56-28059    | * | 3/1981  | ........... B62D 33/037 |

*Primary Examiner* — Gregory A Blankenship
(74) *Attorney, Agent, or Firm* — Dinsmore & Shohl LLP

(57) ABSTRACT

A vehicle including a bed, a plurality of sidewalls extending from the bed in a transversely spaced relationship, and a tailgate member. The bed and the plurality of sidewalls define a cargo space and an end opening into the cargo space. The tailgate member extends across the end opening between the plurality of sidewalls and is pivotally coupled to the plurality of sidewalls via a plurality of hinges. The plurality of hinges provide rotational movement of the power tailgate member from a vehicle inward position to a vehicle outward position such that the power tailgate member has a range of motion of up to 270°. The power tailgate member includes one or more sensors positioned to capture one or more of information pertaining to one or more objects on the bed of the vehicle and information pertaining to a rear of the vehicle.

11 Claims, 4 Drawing Sheets

(56) References Cited

U.S. PATENT DOCUMENTS

| | | | |
|---|---|---|---|
| 11,066,111 B2* | 7/2021 | Stojkovic | B62D 33/0273 |
| 2002/0121794 A1* | 9/2002 | Vejnar | B62D 33/0273 |
| | | | 296/26.11 |
| 2007/0132264 A1* | 6/2007 | Koneval | B62D 33/0273 |
| | | | 296/57.1 |
| 2008/0277958 A1* | 11/2008 | King | B62D 33/0273 |
| | | | 296/50 |
| 2016/0075286 A1* | 3/2016 | Butlin, Jr. | B62D 33/03 |
| | | | 296/50 |
| 2018/0001820 A1* | 1/2018 | Higgins | B62D 33/0273 |
| 2018/0086392 A1* | 3/2018 | Seki | B62D 33/077 |
| 2018/0257537 A1* | 9/2018 | DeSimone | B62D 33/0273 |
| 2018/0290598 A1* | 10/2018 | Khalid | E06B 3/36 |
| 2019/0152387 A1 | 5/2019 | Naserian et al. | |
| 2020/0148283 A1 | 5/2020 | Robinson et al. | |
| 2021/0300482 A1* | 9/2021 | Mooney | B62D 33/037 |
| 2022/0063736 A1* | 3/2022 | Williams | B62D 33/03 |
| 2022/0141423 A1* | 5/2022 | Schondorf | H04N 7/18 |
| | | | 701/300 |

* cited by examiner

VEHICLES HAVING PIVOTABLE AND ROTATABLE TAILGATE MEMBERS

TECHNICAL FIELD

The present specification generally relates to vehicle tailgates, and more specifically, to tailgate members that are pivotally coupled to vehicles such that the tailgate members are rotatable across a range of positions.

BACKGROUND

Vehicle tailgates are generally utilized to provide access to a bed of a vehicle. Conventional tailgates include a tailgate member that is hingedly coupled to a such that the tailgate member moves from a substantially vertical closed position to an open position that is achieved by swinging the tailgate member outwardly (e.g., away from the bed of the vehicle). Such conventional designs have numerous deficiencies. For example, the limited range of movement may only provide for positioning that obstructs a driver's view behind the vehicle such that the driver cannot see one or more additional vehicles coupled via a hitch. Additionally, the limited range of movement of the tailgate members may also limit the different types of vehicle hitching connections that may configured on the vehicle beds. As such, a vehicle operator may opt to remove the tailgate member entirely from the vehicle, which may be undesirable.

SUMMARY

In one aspect, a vehicle includes a bed and a plurality of sidewalls that extend from the bed in a transversely spaced relationship. The bed and the plurality of sidewalls define a cargo space and an end opening into the cargo space. The vehicle also includes a tailgate member that extends across the end opening between the plurality of sidewalls and is pivotally coupled to the plurality of sidewalls via a plurality of hinges. The plurality of hinges provide rotational movement of the tailgate member from a vehicle inward position to a vehicle outward position such that the tailgate member has a range of motion of up to 270°.

In another aspect, a bed, a plurality of sidewalls, and a power tailgate member are provided. A plurality of sidewalls define a cargo space and an end opening into the cargo space. The power tailgate member extends across the end opening between the plurality of sidewalls and is pivotally coupled to the plurality of sidewalls via a plurality of hinges. The plurality of hinges provide rotational movement of the power tailgate member from a vehicle inward position to a vehicle outward position such that the power tailgate member has a range of motion of up to 270°. The power tailgate member includes one or more sensors positioned to capture one or more of information pertaining to one or more objects on the bed of the vehicle and information pertaining to a rear of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein address and overcome the limitations of conventional tailgate members. Specifically, the embodiments described herein are directed to vehicles having power tailgate members that are pivotally coupled to sidewalls defining a bed of the vehicles, the tailgate members movable between a vehicle inward position to a vehicle outward position such that the tailgate members have a range of motion of up to 270°. Additionally, one or more sensors such as, for example, cameras, proximity sensors, and/or the like may be disposed on or around the tailgate members described herein. The structure, coupling mechanism, shape of the tailgate members, and the locations of the one or more sensors positioned on these tailgate members provide vehicles with distinct advantages. Movement of the tailgate members as described herein provides access to the interior of the vehicle bed, which can be utilized in conjunction with the one or more sensors to enable monitoring of one or more items located on the bed. Access to the interior also facilitates hitching of different types of additional vehicles with the use of various hitch connections (e.g., rear receiver hitches, fifth wheel hitches, gooseneck hitches, or the like). When the tailgate members are disposed in the vehicle outward position as described herein, the one or more sensors may be utilized to detect and monitor objects located around the rear of the vehicle.

Figure 1:
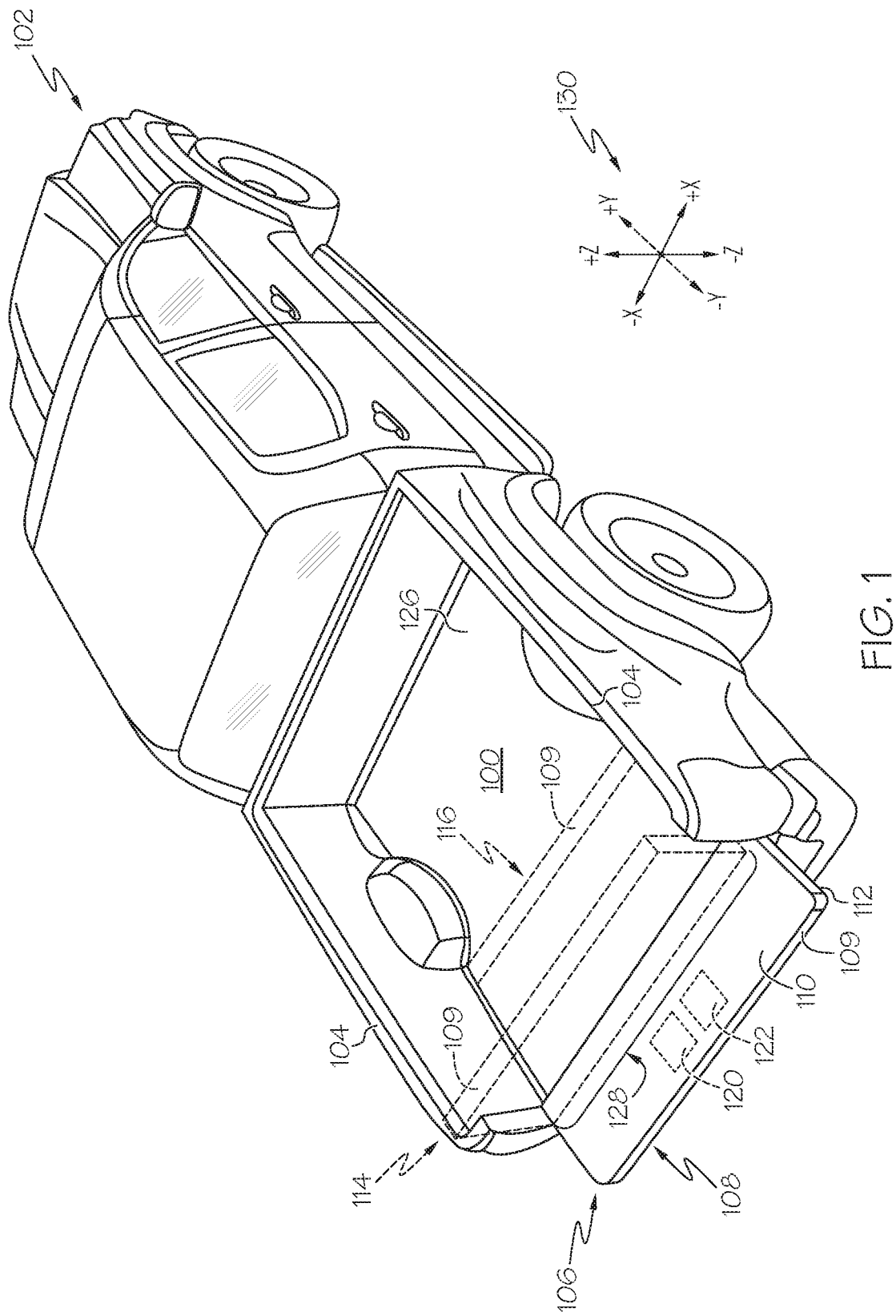
FIG. 1 schematically depicts a perspective view of an illustrative vehicle having a bed and a tailgate member that is hingedly coupled to the vehicle's sidewalls, according to one or more embodiments shown and described herein.

FIG. 1 schematically depicts a vehicle 102 having a bed 100 and a plurality of sidewalls 104 and a tailgate member 106 that is pivotally coupled to the sidewalls 104 and configured in a vehicle outward position 108, according to one or more embodiments shown and described herein.

In particular, FIG. 1 depicts a vehicle 102 (e.g., a pick-up truck) having a bed 100 that is located toward the rear of the vehicle 102. As depicted, a plurality of sidewalls 104 extend from the bed 100 in a transversely spaced relationship such that the bed 100 and the sidewalls 104 define a cargo space 126 and an end opening 128 into the cargo space 126. While the vehicle 102 is depicted as a pick-up truck, other types of vehicles are also contemplated.

The vehicle 102 also includes the tailgate member 106 disposed across the end opening 128 and hingedly coupled to the sidewalls 104 such that the tailgate member 106 selectively provides or restricts access to the cargo space 126 via the end opening 128. In embodiments, as depicted in FIG. 1, the tailgate member 106 is of a substantially cuboid shape and has dimensions such that the tailgate member 106, when pivotally coupled to the plurality of sidewalls 104 and configured in a particular position (e.g., a closed position 114), occupies substantially the entire portion of the end opening 128 that is located between the plurality of sidewalls 104. It is noted that the tailgate member 106 may be, for example, a manual tailgate member or a power tailgate member that is operable using a remote control or one or more wired or wireless controls. For example, the wired or wireless controls may be located adjacent to the driver's seat, on the dashboard, and/or the like.

Figure 3:
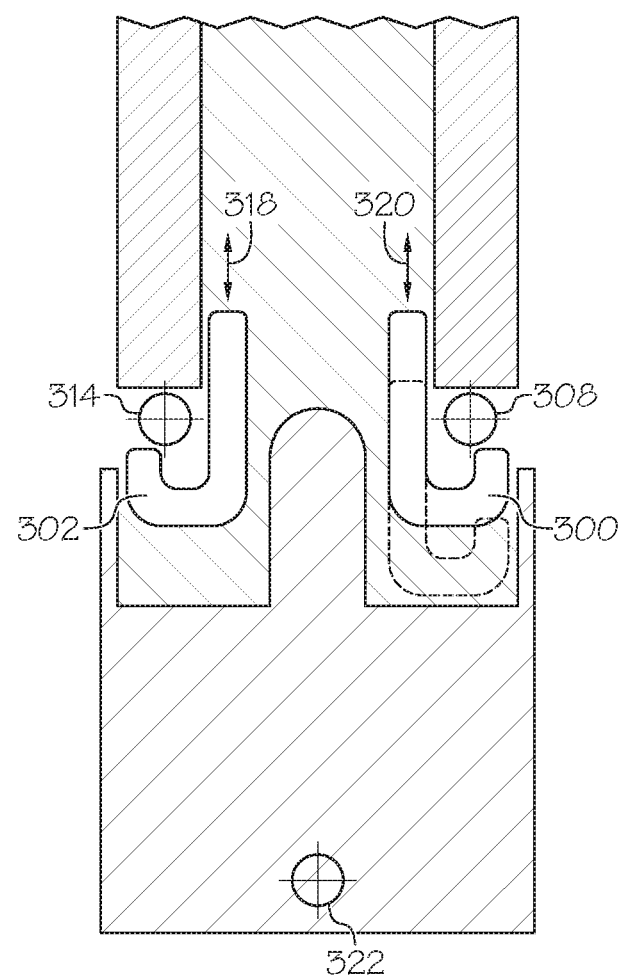
FIG. 3 schematically depicts a cross sectional view of an illustrative tailgate member having a plurality of illustrative J-Hooks disposed therein and used to pivotally couple the tailgate member to sidewalls of a vehicle according to one or more embodiment shown and described herein.

The tailgate member 106 extends across the end opening 128 between the sidewalls 104 and is coupled to the sidewalls 104 via a plurality of hinges (not depicted; see e.g., J-Hooks 300, 302 as depicted in FIG. 3). Still referring to FIG. 1, each of the plurality of hinges provides rotational movement of the tailgate member 106 from a vehicle inward position 116 (depicted in phantom) to a vehicle outward position 108 such that the tailgate member 106 has a range of motion of up to 270° (not depicted in FIG. 1). The tailgate member 106 disposed in the vehicle inward position 116 is at about 1 degree to about 90 degrees inwards relative to the closed position 114 and the tailgate member 106 disposed in the vehicle outward position 108 is at about 1 degree to about 180 degrees outwards relative to the closed position. In between the vehicle inward position 116 and the vehicle outward position 108 is a closed position 114 (depicted in phantom) where the tailgate member 106 is disposed in a substantially vehicle vertical direction (e.g., an upper surface 109 of the tailgate member 106 generally faces the +z direction of the coordinate axes 130 of FIG. 1). When the tailgate member 106 is configured in the vehicle inward position 116, the tailgate member 106 rests upon or within the bed 100, as described in greater detail hereinbelow. In embodiments, the tailgate member 106, when arranged in the vehicle inward position 116, the upper surface 109 the tailgate member 106 generally faces toward the +y direction of the coordinate axes 130 from the closed position 114, as depicted in FIG. 1. When the tailgate member 106 is configured in the vehicle outward position 108, the tailgate member 106 may be movable between various positions such as (but not limited to), a substantially horizontal positioning whereby the tailgate member 106 (e.g., a major surface 110 thereof) is substantially coplanar with the bed 100 of the vehicle 102), a substantially vertical positioning whereby the upper surface faces downward (e.g., in the −z direction of the coordinate axes 130 of FIG. 1). That is, the upper surface 109 tailgate member 106 generally rotates toward the −y direction and/or the −z direction of the coordinate axes 130 from the closed position 114, as described in greater detail hereinbelow.

In some embodiments, the tailgate member 106 includes sensors 120, 122, which are located on the major surface 110 of the tailgate member 106 and/or embedded within the tailgate member 106. In some embodiments, the sensors 120, 122 may be positioned on any location on the major surface 110, (e.g., towards the edges of the major surface 110, near a center portion of the major surface 110, or the like). In embodiments, the sensors 120, 122 may be disposed or positioned on the tailgate member 106 such that the sensors are visible on and accessible via both the major surface 110 and a second major surface 112. The sensors 120, 122 may be, for example, cameras, proximity sensors, motion sensors, pressure sensors, and/or the like. While FIG. 1 depicts two sensors, the present disclosure is not limited to such. That is, any number of sensors may be used without departing from the scope of the present disclosure.

When the tailgate member 106 is positioned in the vehicle inward position 116, the sensors 120, 122 of the tailgate member 106 may be utilized to monitor one or more objects located on the bed 100. In embodiments, the sensors 120, 122 may be positioned on any part of the major surface 110, the second major surface 112, or the upper surface 109 of the tailgate member 106. Alternatively or additionally, the sensors 120, 122 may also be embedded within the tailgate member 106 or other surfaces or edges of the tailgate member 106. In embodiments, when the tailgate member 106 is in the vehicle inward position 116, the sensors 120, 122 may be motions sensors (embedded or positioned in one or more of the surfaces of the tailgate member 106) that collect data in real time of, for example, movement of one or more items located on the bed 100. Alternatively or additionally, one or more of the sensors 120, 122 may include, for example, a camera that is positioned to capture information pertaining to one or more objects on the bed of the vehicle. In embodiments, the sensors 120, 122 may be usable to monitor, in real time, the status of one or more objects located on the bed 100. For example, the sensors 120, 122 may provide a live stream of one or more objects that are located on the bed of the vehicle to a display located within a cabin of the vehicle 102.

When the tailgate member 106 is positioned in the vehicle inward position 116, the tailgate member 106 provides access to an interior of the bed 100 via the end opening 128. When in such a position, different types of hitches, (e.g., hitches of different shapes, dimensions, and/or the like) may be utilized to couple various types of additional vehicles to the bed 100 of the vehicle 102. In embodiments, the tailgate member 106 positioned in the vehicle inward position 116 facilitates the attachment of $5^{th}$ wheel and/or gooseneck hitches (not shown). It is noted that, conventionally, $5^{th}$ wheel and/or gooseneck hitches required the removal or detachment of the tailgates from vehicles. By enabling the attachment of $5^{th}$ wheel and/or gooseneck hitches in the vehicle inward position 116, the operation of the tailgate member 106 described herein ensures that tailgate member 106 does not have to be removed or detached from the vehicle 102. In embodiments, the connection points (not shown) of the hitches to the vehicle 102 may be located on or around the center of the bed 100. Additionally, the sensors 120, 122 may be used in conjunction with each other to monitor, in real time, a status of the hitches. In this way, occupants of the vehicle cabin may be informed, in real time, of instances in which a trailer connection to the hitch may be loose, damaged, and/or the like.

When in the vehicle outward position 108, just as in the vehicle inward position 116, the tailgate member 106 provides access to an interior of the bed 100 via the end opening 128. In particular, when in the vehicle outward position 108, different types of hitches (e.g., hitches of different shapes, dimensions, and/or the like) may be utilized to couple various types of additional vehicles to the bed 100 of the vehicle 102. Additionally, in embodiments, the sensors 120, 122, as stated above, may be positioned on any part of the major surface 110, the second major surface 112, or the upper surface 109 of the tailgate member 106. Alternatively or additionally, the sensors 120, 122 may also be embedded within the tailgate member 106 or other surfaces or edges of the tailgate member 106. For example, one or more cameras may be position of the upper surface 109, which may facilitate the capture of information pertaining to a rear of the vehicle 102.

Figure 2:
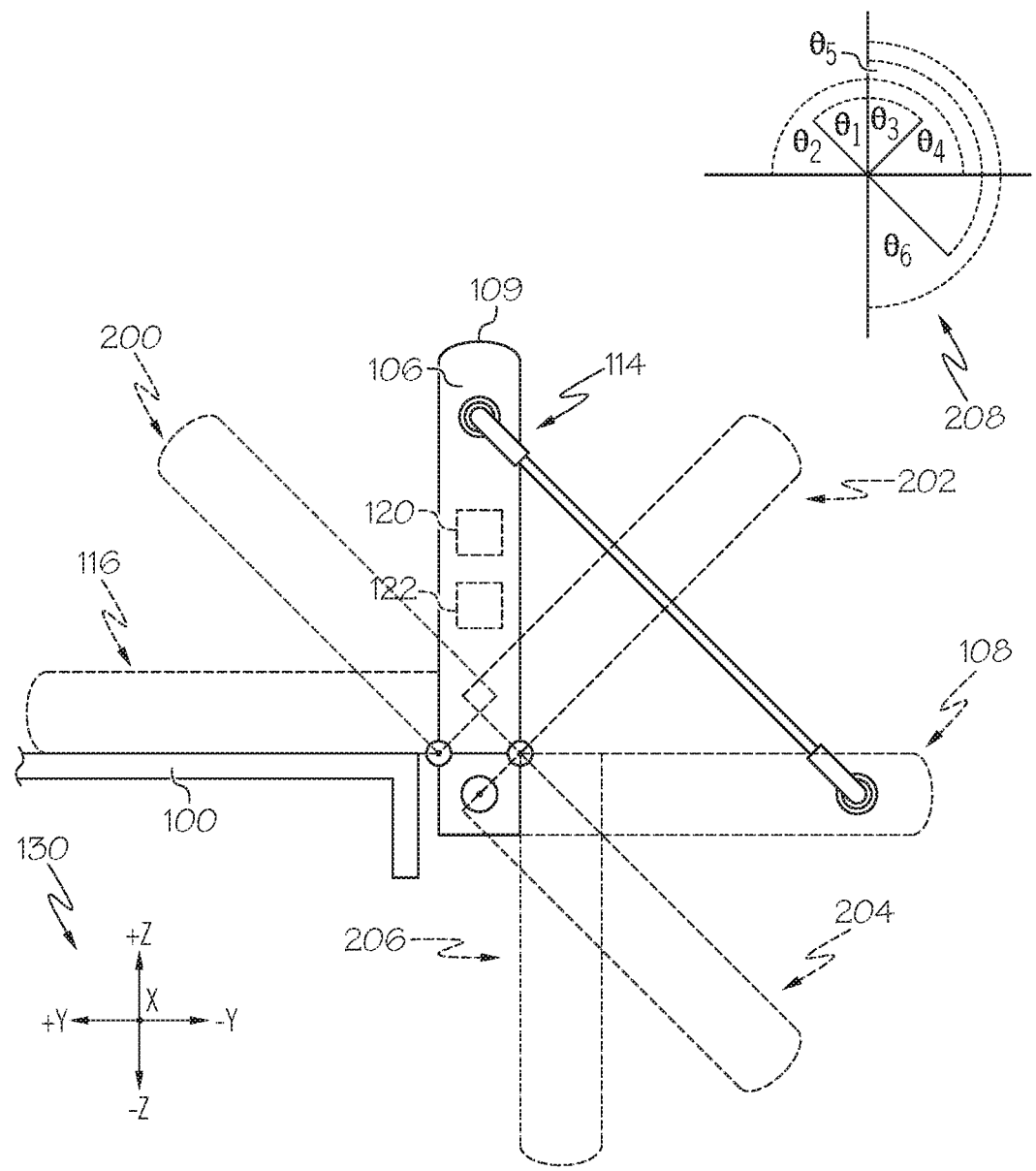
FIG. 2 schematically depicts a side view of an illustrative tailgate member movable to various positions, according to one or more embodiments shown and described herein.

In another example, when the tailgate member 106 is in the vehicle outward position 108, a camera that is embedded on the major surface 110 may detect an object on the bed 100 that has slid across the bed 100 and is now positioned on the major surface 110. In the vehicle outward position 108, this object may possibly fall outside the bed 100 into an area external to the bed 100. The camera may capture an image of such an object and transmit this information, in real time, to a processor included in the vehicle 102, which may then output the captured image on a display located within a cabin of the vehicle 102. In this way, a driver may be warned, in real time, of the possibility of the object failing outside the vehicle and onto a roadway. Additionally, the sensors 120, 122 may be one or more proximity sensors that are positioned on the tailgate member 106 that may be usable to assist in the parking of the vehicle 102. In particular, in embodiments, when the tailgate member 106 is moved to a particular vehicle outward position (for example, a fourth vehicle outward position 206 that is depicted in FIG. 2, but not shown in FIG. 1), the tailgate member 106 may partially or completely obstruct one or more proximity sensors positioned on, for example, the rear bumper of the vehicle 102. As such, the operation of the one or more proximity sensors on the rear bumper of the vehicle 102 may be adversely affected.

When the tailgate member 106 is in the fourth vehicle outward position 206, the sensors 120, 122 may be used to detect the presence of one or more objects within a certain distance of the tailgate member 106, and as such, perform the function of the one or more proximity sensors that may be positioned on the rear bumper of the vehicle 102. In embodiments, the sensors 120, 122 may detect the presence of one or more moving or stationary objects within a proximity of the rear bumper of the vehicle 102. The driver may be informed of the presence of one or more of these detect objects, for example, via a visual warning that is output on a display located within a cabin of the vehicle 102 and/or an audio message that is output from one or more speakers of the vehicle 102. In this way, the sensors 120, 122 may assist a driver in parking the vehicle 102.

In embodiments, when the tailgate member 106 is in the vehicle outward position 108, the one or more proximity sensors may be embedded in the tailgate member 106 or positioned on any part of the major surface 110, the second major surface 112, or the upper surface 109. In embodiments, one or more of these proximity sensors may be positioned on all of these surfaces. As such, the proximity sensors may face various directions in and around the rear bumper of the vehicle such that moving and stationary objects within a certain proximity of the bumper, the tailgate member 106, and/or the like may be detected. Alternatively or additionally, the sensors 120, 122 may be cameras that are embedded in may be embedded in the tailgate member 106 or positioned on any part of the major surface 110, the second major surface 112, or the upper surface 109. As such, the cameras may be facing all of the direction surrounding the tailgate member 106. In embodiments, these cameras be usable to capture images of moving and stations objects within a certain proximity of the bumper, the tailgate member 106, and/or the like. The capture images may then be transmitted to a transceiver of the vehicle 102, processed by a processor of the vehicle 102, and output on a display located within a cabin of the vehicle 102.

FIG. 2 schematically depicts various illustrative positions of the tailgate member 106 from the closed position 114 to a plurality of different vehicle inward positions and a plurality of different vehicle outward positions such that the vehicle 102 is shown to have a range of motion of up to 270°, according to one or more embodiments shown and described herein. That is, the tailgate member 106 may be rotated to any positioning within the range of motion described herein. As will be evident from the description below, the tailgate member 106 may be stopped at various locations to provide various degrees of opening within the full range of motion described herein. In addition, it should be understood that the range of motion described herein is up to 270°. That is, ranges of motions less than 270° are contemplated and included within the scope of the present disclosure.

In particular, FIG. 2 depicts a side view of the tailgate member 106 configured in the closed position 114. The closed position 114 is a substantially vertical position such that the tailgate member 106 is configured or oriented at about 90 degrees relative to the bed 100. In other words, in the closed position 114, the tailgate member 106 is configured in a position whereby the upper surface 109 of the tailgate member 106 faces substantially toward the +z direction of the coordinate axes 130 of FIG. 2, while the bed 100 extends substantially in the plane defined by the =Y/–Y and X axes of the coordinate axes 130 depicted in FIG. 2. From the closed position 114, the tailgate member 106 may be movable to a variety of positions ranging from the vehicle inward position 116 to the fourth vehicle outward position 206, as depicted in FIG. 2 (e.g., a range of motion of up to 270°). Each of these illustrative positions are explained in detail below. It is noted that the tailgate member 106 may be configured in the variety of positions based on rotational movements that are possible with the use of the plurality of hinges and/or hooks (e.g., J-Hooks 300, 302 that are depicted in FIG. 3, but not shown in FIG. 2).

Still referring to FIG. 2, from the closed position 114, the tailgate member 106 may be rotated to a second vehicle inward position 200, which corresponds substantially to a rotational movement of about 45 degrees in the +y direction towards the bed 100 of the vehicle 102. The rotational movement of about 45 degrees from the closed position 114 corresponds to theta 1 ($\theta_1$).

In addition, from the closed position 114, the tailgate member 106 may be movable to the vehicle inward position 116, which may correspond substantially to a rotational movement of about 90 degrees in the +y direction such that the tailgate member 106 rests on or is configured on top of the bed 100. In the vehicle inward position 116, the second major surface 112 faces substantially towards the +z direction of the coordinate axes 130 of FIG. 2, while the bed 100 extends substantially in the plane defined by the =Y/–Y and X axes of the coordinate axes 130 depicted in FIG. 2. The rotation movement of about 90 degrees from the closed position 114 corresponds to theta 2 ($\theta_2$). As described in detail above, when the tailgate member 106 is in the vehicle inward position 116, the tailgate member 106 provides various advantages, e.g., monitoring of one or more objects on the bed 100, and providing access to an interior of the bed 100 via the end opening, which in turn enables coupling of different types of hitches (e.g., hitches of different shapes, dimensions, and/or the like) to one or more connections on the bed 100 (not shown). These hitches may be used to transport one or more additional vehicles behind the vehicle 102. It is noted that each of the vehicle inward positions (e.g., vehicle inward position 116 or second vehicle inward position 200) are positions ranging from about 1 degree to about 90 degrees inwards relative to the closed position 114. In these positions, the tailgate member 106 is in the cargo space 126.

In embodiments, the tailgate member 106 may be configured in a second vehicle outward position 202, which corresponds substantially to a rotational movement of about 45 degrees in the −y direction from the closed position 114. The rotational movement of about 45 degrees from the closed position 114 corresponds to theta 3 ($\theta_3$).

In addition, from the closed position 114, the tailgate member 106 may be configured in the vehicle outward position 108, which may correspond to a rotational movement of about 90 degrees such that the major surface 110 of the tailgate member 106 is parallel to the bed 100, and the second major surface 112 of the tailgate member 106 is facing the ground, as depicted in FIG. 1. Such a rotational movement corresponds to theta 4 ($\theta_4$). In the vehicle outward position 108, just as in the vehicle inward position 116, the tailgate member 106 may provide access to the interior of the bed 100 via the end opening 128. Additionally, as stated, configuring the tailgate member 106 in the vehicle outward position 108 provides advantages, e.g., one or more of the sensors 120, 122 (e.g., a motion sensor, a proximity sensors, a camera, and/or the like) may be used to detect an object on the bed 100 that is sliding towards the end opening 128 and possibly falling into an area that is external to the bed 100. Alternatively or additionally, a camera may also be used to capture such an occurrence in real time. In embodiments, a live stream of such an occurrence may be provided to, e.g., a display located adjacent to the driver's seat in the vehicle 102.

Additionally, in embodiments, the tailgate member 106 may be configured in a third vehicle outward position 204 and fourth vehicle outward position 206, which corresponds to rotational movements of 135 degrees and 180 degrees, respectively, from the closed position 114. The rotational movements of 135 degrees and 180 degrees correspond to theta 5 ($\theta_5$) and theta 6 ($\theta_6$), respectively. It is noted that each of the vehicle outwards positions (e.g., the vehicle outward position 108, the second vehicle outward position 202, the third vehicle outward position 204, and the fourth vehicle outward position 206) are positions ranging from about 1 degree to about 180 degrees outwards relative to the closed position 114. In these positions, the tailgate member 106 outside is external to the cargo space 126.

FIG. 3 schematically depicts a cross sectional view of an illustrative tailgate member having a plurality of illustrative J-Hooks disposed therein and used to pivotally couple the tailgate member to sidewalls of a vehicle according to one or more embodiment shown and described herein. In particular, FIG. 3 depicts an orientation and coupling of a plurality of illustrative J-Hooks 300, 302 that are used to pivotally couple the tailgate member 106 to a plurality of the vehicle's sidewalls 104 so as to enable the tailgate member 106 to have a range of motion from approximately 1° to 270°. It is also noted that the plurality of J-Hooks serve as locking mechanisms disposed within the tailgate member 106 that are arrangeable around the plurality of hinges (for example, hinges 308, 314, and 322) in order to selectively lock movement the tailgate member 106 around each one of these hinges. It is further noted that J-Hooks 300, 302 are retention components disposed in the tailgate member 106 (e.g., within recesses of the tailgate member 106). It should be understood that the J-Hooks 300, 302 described herein are merely one illustrative example of a hinge mechanism that may be used to achieve the rotational movement of the tailgate member 106 described herein. That is, other similar components may also be used without departing from the scope of the present disclosure.

In embodiments, long ends 304 and 310 of the J-Hooks 300, 302 may be embedded within cavities disposed in the tailgate member 106, enabling the tailgate member 106 to slide upwards and downwards as indicated by the directions 318 and 320. In operation, when the J-Hooks 300, 302 are engaged with or closely positioned around hinges 308 and 314, respectively, the tailgate member 106 is locked in a straight position. In embodiments, when the J-Hook 302 is disengaged from hinge 314 (for example, there is some space between the hinge 314 and the J-Hook 302), the tailgate member 106 may pivot or rotate around J-Hook 300. When the J-Hook 302 is engaged with or closely positioned around the hinge 314 and hinge 322 is in a locked position, the tailgate member 106 may be rotated 180°, for example, from the closed position 114 to the fourth vehicle outward position 206. When the J-Hook 300 is engaged with or closely positioned around the hinge 308 and the hinge 322 is in a locked position, the J-Hook 302 and hinge 314 may be utilized to move or rotate the tailgate member 106 around 90° forward, for example, from the closed position 114 to the vehicle outward position 108. Various other features of the J-hooks 300, 302 not specifically described herein should generally be understood.

Figure 4C:
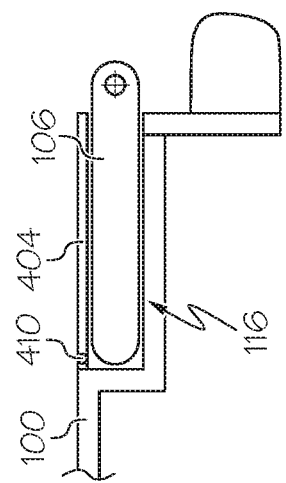
FIG. 4C schematically depicts an illustrative tailgate member arranged in an inward position such that the tailgate member is disposed within a recess in the bed and is enclosed within the recess by a door arranged in a closed position, according to one or more embodiments shown and described herein.
Figure 4B:
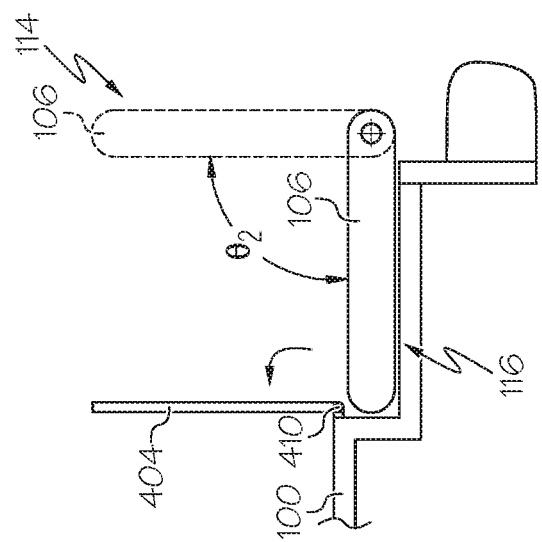
FIG. 4B schematically depicts an illustrative tailgate member arranged in an inward position at about 90 degrees relative to a closed position such that the tailgate member is disposed within a recess in a bed with a door arranged in an open position, according to one or more embodiments shown and described herein.
Figure 4A:
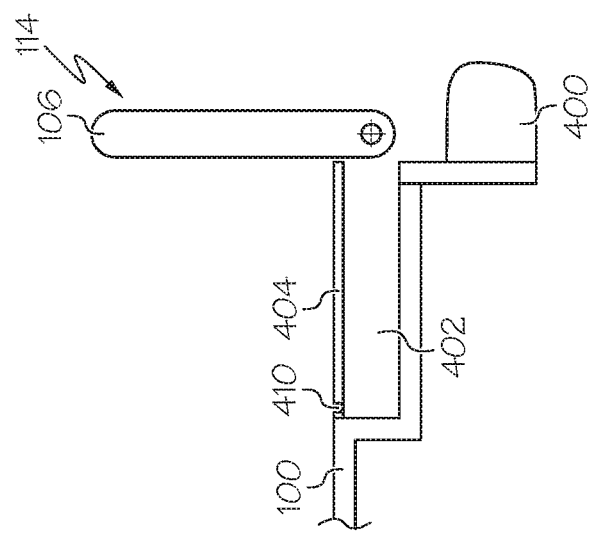
FIG. 4A schematically depicts an illustrative tailgate member arranged in a closed position relative to the bed of the vehicle with a recess and a door disposed to cover the recess, according to one or more embodiments shown and described herein.

FIGS. 4A-4C depict an embodiment whereby the bed 100 includes a closable recess that can receive the tailgate member 106 when in vehicle inward position such that the tailgate member 106 does not take up space on top of the bed 100. FIG. 4A schematically depicts a partial side view of the tailgate member 106 being configured in a closed position 114 relative to the bed 100 of the vehicle 102 with a recess 402 and a door 404 disposed to cover the recess 402, according to one or more embodiments shown and described herein.

In particular, FIG. 4A depicts the tailgate member 106 in a vertical position such that the tailgate member 106 is oriented at 90 degrees relative to the bed 100 of the vehicle 102 (FIG. 1). Additionally, FIG. 4A depicts a recess 402 that is disposed within a portion of the bed 100. In embodiments, the recess 402 may be a compartment that is generally shaped and sized to correspond to a shape and size of the tailgate member 106 such that the tailgate member 106 can be fully received within the recess 402 and the door 404 can be closed over the tailgate member 106. As such, the recess 402 may be shaped an sized to enclose the entirety of the tailgate member 106. FIG. 4A also depicts the door 404 as being hingedly coupled to an edge of the recess 402. In some embodiments, the door 404 may be removably coupled to the edge of the recess 402. In other embodiments, the door 404 may be coupled to the edge of the recess 402 via a hinge 410 (as depicted in FIG. 4A).

FIG. 4B schematically depicts the tailgate member 106 positioned in the vehicle inward position 116 at about 90 degrees relative to the closed position 114 such that the tailgate member 106 is disposed within the recess 402 in the bed 100. In such a position, the tailgate member 106 is rotated substantially 90 degrees towards the +y direction as described herein. The rotational movement from the closed position 114 corresponds to theta 2 ($\theta_2$), as depicted in FIG.

2. It is noted that in FIG. 4B, the door 404 is depicted in the open position. As depicted in FIG. 4C, the door 404 is rotated over the tailgate member 106 to enclose the tailgate member within the recess 402.

FIG. 4C schematically depicts the tailgate member 106 configured in the exemplary vehicle inward position 406 such that the tailgate member 106 is disposed within a recess 402 in the bed 100 and is enclosed within the recess 402 by the door 404, according to one or more embodiments shown and described herein. In FIG. 4C, the door 404 is depicted in a closed position, and in this way, encloses the tailgate member 106 in the recess 402. It is noted that, when the tailgate member 106 is disposed in the recess 402 and enclosed by the door 404, and added benefit is that paint on the tailgate member 106 will not suffer cosmetic damage such as paint scratches, and/or the like. Additionally, because the tailgate member 106 disclosed in the recess 402 and enclosed by the door 404, it will be substantially separate from and will not interfere with any hitching connections or contact one or items located on the bed 100.

It should now be understood that the embodiments described herein are directed to a vehicle comprising a bed and a plurality of sidewalls that extend from the bed in a transversely spaced relationship. The bed and the plurality of sidewalls define a cargo space and an end opening into the cargo space. The vehicle also includes a tailgate member extending across the end opening between the plurality of sidewalls. In embodiments, the tailgate member is pivotally coupled to the plurality of sidewalls via a plurality of hinges. The plurality of hinges provide rotational movement of the tailgate member from a vehicle inward position to a vehicle outward position such that the tailgate member has a range of motion of up to 270° to allow for flexibility in opening and closing the tailgate, particularly for the purposes of using various hitch receivers, such as rear receiver hitches, fifth wheel hitches, gooseneck hitches, or the like.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle, comprising:
    a bed;
    a plurality of sidewalls that extend from the bed in a transversely spaced relationship, the bed and the plurality of sidewalls defining a cargo space and an end opening into the cargo space;
    a tailgate member extending across the end opening between the plurality of sidewalls, the tailgate member pivotally coupled to the plurality of sidewalls via a plurality of hinges, the plurality of hinges providing rotational movement of the tailgate member from a vehicle inward position to a vehicle outward position; and
    a plurality of a J-Hook locking mechanisms disposed within the tailgate member, each arrangeable around a corresponding one of the plurality of hinges to selectively lock movement of the tailgate member with respect to the plurality of hinges.

2. The vehicle of claim 1, wherein the tailgate member, when located in the vehicle inward position and in the vehicle outward position, provides access to an interior of the bed via the end opening.

3. The vehicle of claim 1, further comprising one or more sensors positioned to capture one or more of information pertaining to one or more objects on the bed of the vehicle and information pertaining to a rear of the vehicle.

4. The vehicle of claim 1, wherein the vehicle inward position is such that the tailgate member is disposed within a recess in the bed.

5. The vehicle of claim 4, further comprising a door disposed to cover the recess, wherein the tailgate member, when in the vehicle inward position, is enclosed within the recess by the door.

6. The vehicle of claim 1, further comprising a retention component disposed on at least one of the plurality of sidewalls and the tailgate member, the retention component locking the tailgate member in a closed position between the vehicle inward position and the vehicle outward position.

7. The vehicle of claim 6, wherein when the tailgate member is in the closed position between, the tailgate member is in a vertical position such that the tailgate member is disposed at about 90 degrees relative to the bed.

8. The vehicle of claim 1, wherein the tailgate member is disposed in the vehicle inward position at about 1 degree to about 90 degrees inwards relative to a closed position.

9. The vehicle of claim 1, wherein the tailgate member is disposed in the vehicle outward position at about 1 degree to about 180 degrees outwards relative to a closed position.

10. A vehicle, comprising:
    a bed;
    a plurality of sidewalls that extend from the bed in a transversely spaced relationship, the bed and the plurality of sidewalls defining a cargo space and an end opening into the cargo space;
    a power tailgate member extending across the end opening between the plurality of sidewalls, the power tailgate member pivotally coupled to the plurality of sidewalls via a plurality of hinges, the plurality of hinges providing rotational movement of the power tailgate member from a vehicle inward position to a vehicle outward position such that the power tailgate member has a range of motion of up to 270°, the power tailgate member including one or more sensors positioned to capture one or more of information pertaining to one or more objects on the bed of the vehicle and information pertaining to a rear of the vehicle; and a plurality of a J-Hook locking mechanisms disposed within the power tailgate member, each arrangeable around a corresponding one of the plurality of hinges to selectively lock movement of the power tailgate member with respect to the plurality of hinges.

11. An apparatus, comprising:

a tailgate member extending between a pair of sidewalls of a vehicle bed;

a plurality of hinges pivotally coupling the tailgate member to the pair of sidewalls and providing rotational movement of the tailgate member from a vehicle inward position to a vehicle outward position; and a plurality of a J-Hook locking mechanisms disposed within the tailgate member, each arrangeable around a corresponding one of the plurality of hinges to selectively lock movement of the tailgate member with respect to the plurality of hinges.

* * * * *

UNITED STATES PATENT AND TRADEMARK OFFICE
CERTIFICATE OF CORRECTION

| | |
|---|---|
| PATENT NO. | : 11,530,002 B2 |
| APPLICATION NO. | : 17/011625 |
| DATED | : December 20, 2022 |
| INVENTOR(S) | : Paxton S. Williams |

It is certified that error appears in the above-identified patent and that said Letters Patent is hereby corrected as shown below:

In the Specification

Column 2, Line 15, delete "embodiment", and insert --embodiments--, therefor.

Column 7, Line 57, delete "embodiment", and insert --embodiments--, therefor.

Column 8, Line 53, before "sized", delete "an", and insert --a--, therefor.

Signed and Sealed this
Seventh Day of February, 2023

Katherine Kelly Vidal
*Director of the United States Patent and Trademark Office*